United States Patent [19]

Djorup

[11] 4,024,761

[45] May 24, 1977

[54] DIRECTIONAL HOT FILM ANEMOMETER TRANSDUCER

[75] Inventor: Robert S. Djorup, Wellesley, Mass.

[73] Assignee: Kyma Corporation, Wellesley Hills, Mass.

[22] Filed: June 11, 1976

[21] Appl. No.: 695,275

[52] U.S. Cl. .................................. 73/204; 73/189; 338/308; 338/320

[51] Int. Cl.² .......................................... G01F 1/68

[58] Field of Search ............ 73/204, 189; 338/308, 338/295, 318, 319, 320, 325

[56] References Cited

UNITED STATES PATENTS

| 3,592,055 | 7/1971 | Dorman | 73/204 |
|---|---|---|---|
| 3,677,085 | 7/1972 | Hayakawa | 73/204 |
| 3,900,819 | 8/1976 | Djorup | 73/204 |

Primary Examiner—Herbert Goldstein
Attorney, Agent, or Firm—Robert G. Mentag

[57] ABSTRACT

A directional hot film anemometer transducer for sensing the speed and direction of a fluid velocity vector that describes the motion of the fluid in which the transducer is immersed. The transducer is constructed of two cylindrical resistive electrical conductors which are mounted on either side of a third cylindrical member that is used for mechanical support and which also may be used as a biasing heated resistive electrical conductor so as to improve the spatial directional response of the three element transducer. The three cylindrical elements are supported so as to maintain their axes within a single plane and are joined by bridging means which provides a degree of thermal isolation between the conductors in order to facilitate the determination of instantaneous fluid flow direction. The bridging means is primarily intended to close the aerodynamic path between the conductors so that the transducer array functions as a single constant temperature element when the array is excited by an appropriate constant temperature anemometer electronic control system electrically coupled to each conductor of the transducer array. The electrical conductors can be metallic or resistive films which are deposited on a cylindrical supporting body. Each conductor which is actively used within the transducer array is made of a material which exhibits a change in its electrical resistivity as a function of temperature. Electrical connections are provided on each end of each conductor to permit each conductor to be separately heated by its own electrical current. The conductors in the transducer array may be fabricated in the form of a cantilever or single ended device.

13 Claims, 12 Drawing Figures

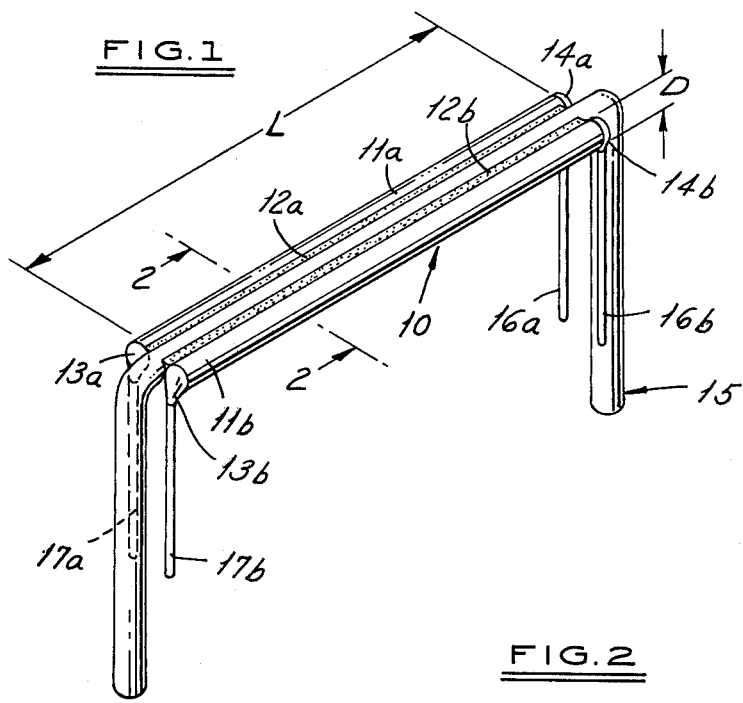
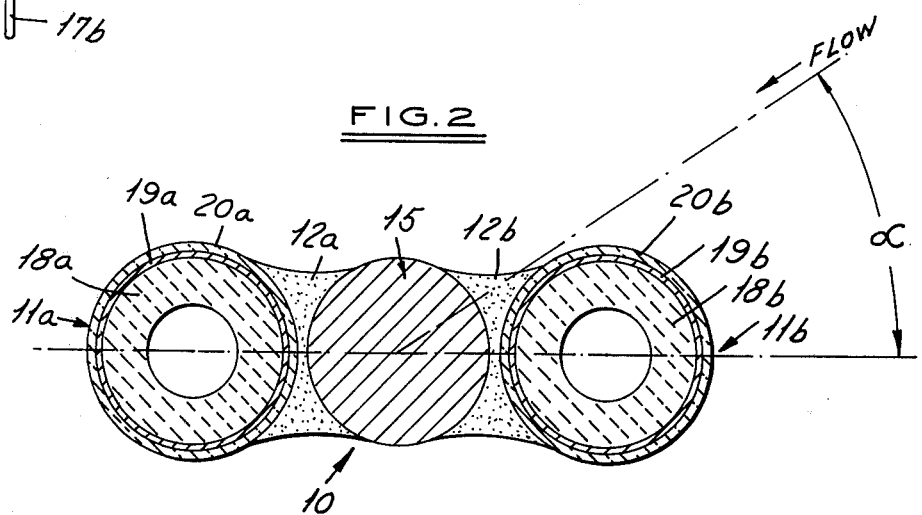
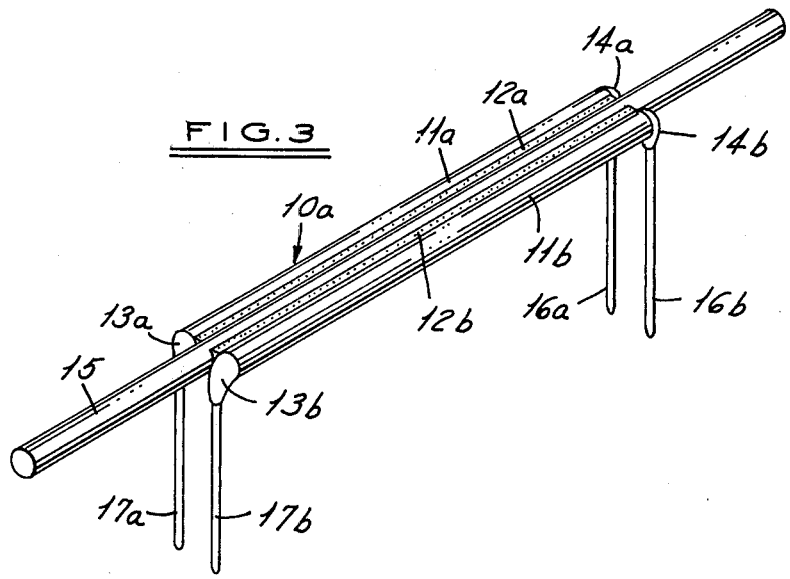

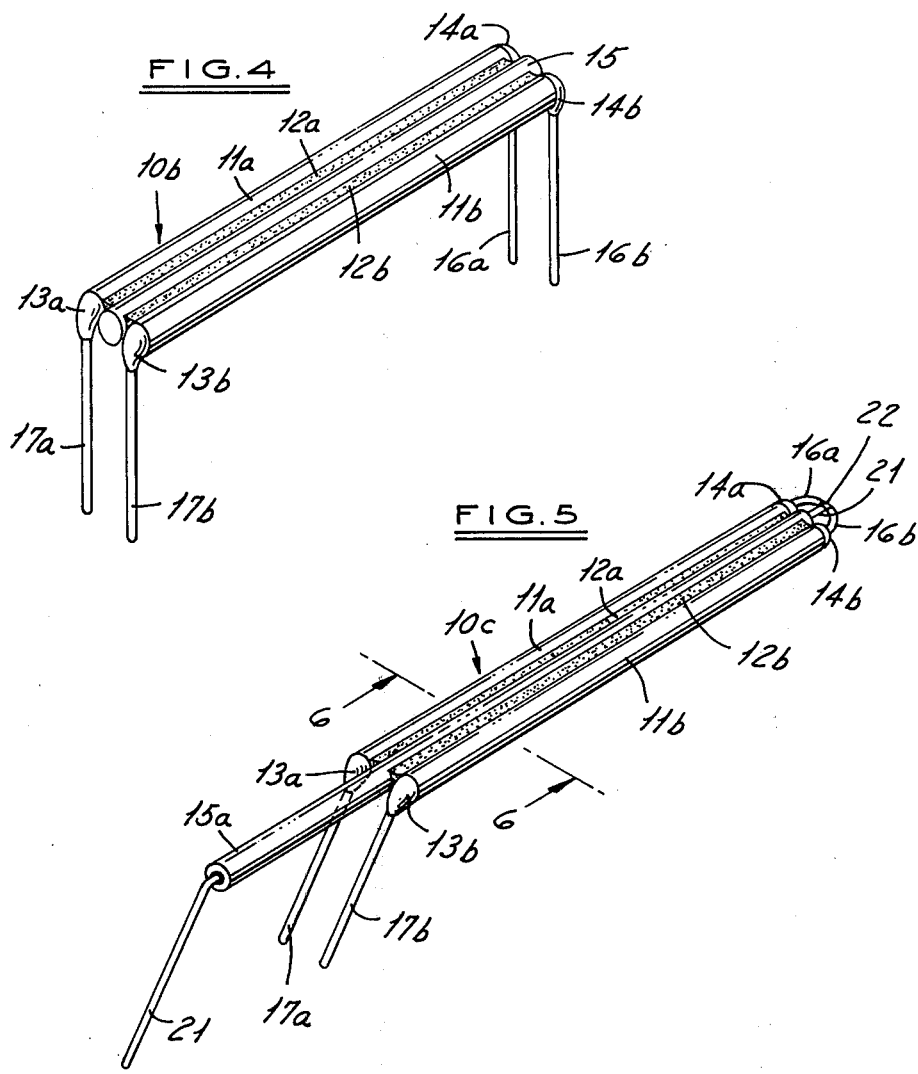

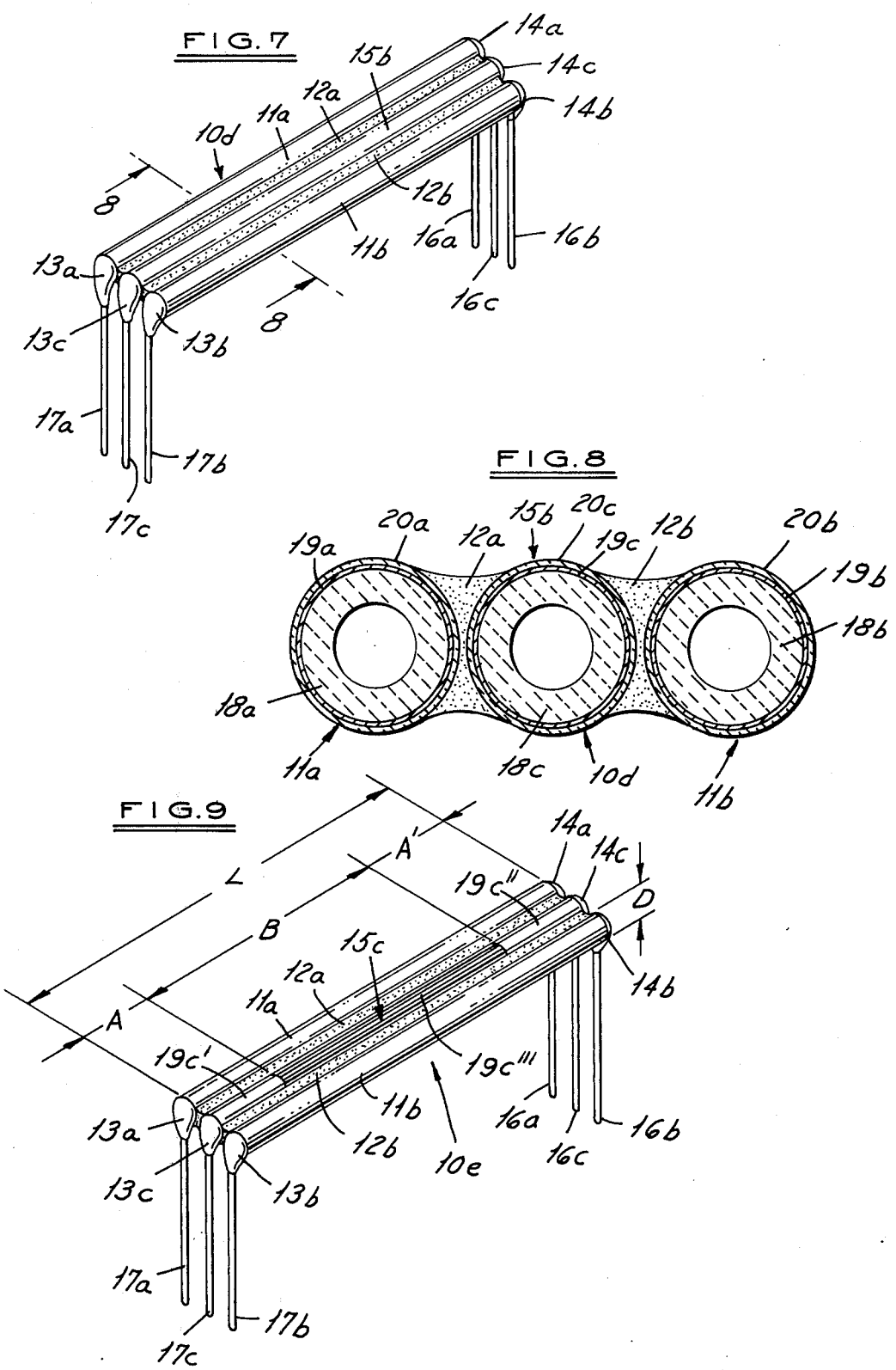

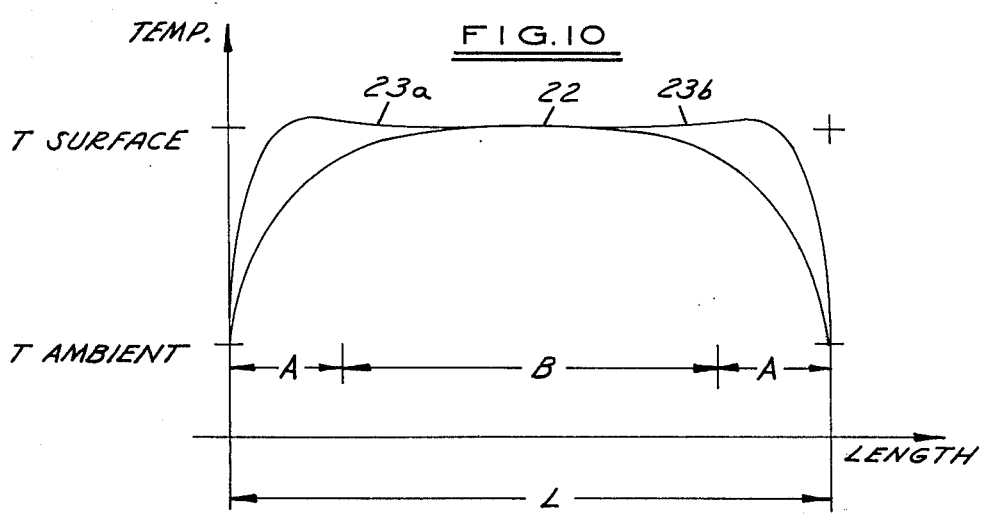
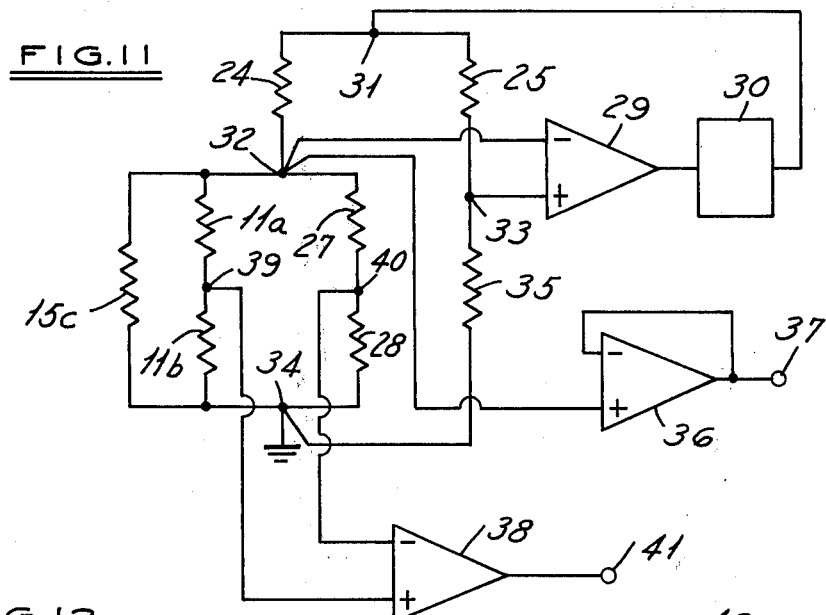
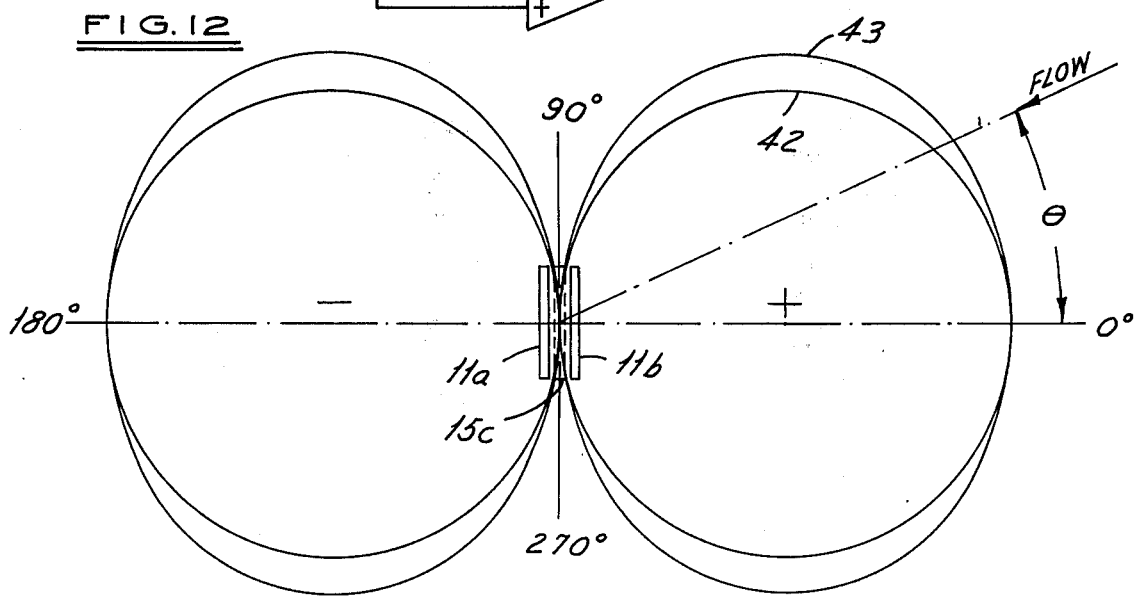

DIRECTIONAL HOT FILM ANEMOMETER TRANSDUCER

SUMMARY OF THE INVENTION

This invention relates generally to anemometer sensing apparatus for ascertaining motion of a fluid relative to the apparatus, and more particularly, to a transducer apparatus employing electrically self-heated conductors for determining speed, mass flow and direction of motion of the fluid in which the transducer is immersed.

Heretofore, thermal anemometer sensors of various types have been developed for measuring classical fluid flow parameters. Examples of these sensors are described, and circuits therefor, are shown in U.S. Pat. Nos. 3,138,025, 3,333,470, 3,352,154, 3,604,261, and most particularly, by U.S. Pat. No. 3,900,819. The present invention overcomes several inherent deficiencies and disadvantages found in the transducer disclosed in the last mentioned U.S. patent.

Although dual element transducers built in accordance with the teachings of U.S. Pat. No. 3,900,819 represent a significant improvement over the use of hot wire and other highly fragile sensing elements, it has been found that the use of hollow cylindrical ceramic substrate supported metallic films have had a particular susceptibility to light impact damage by sleet particles, small hailstones, gravel, pencils, and curious fingers. When mounted on high isolated towers, away from the ground and people, these units have been found to be fairly reliable with the exception of exposure to frozen precipitation. It also has been observed that the measured cosine response of the transducer array is by no means near the ideal. It appears that maximum errors in angular measurements by pairs of conjugate transducers occur at or near the 45° points between the cardinal points of 0°, 90°, 180°, 270° and 360°.

In view of the foregoing, it is an important object of the present invention to provide a novel and significantly improved directional hot film anemometer sensor which overcomes the aforementioned disadvantages of the prior art fluid flow sensors.

It is a further object of the present invention to provide an anemometer transducer which has no moving parts, provides a broad dynamic range of operation, and which may be exposed to an extremely wide range of environmental extremes with sustained exposure to frozen precipitation, as in the case of mountain or northern weather stations, without the need for extensive protective mechanical basketlike enclosure structure, or auxiliary de-icing heating of the protective structure, by doing away with the protective structure itself.

It is another object of the invention to provide a novel and improved multi-element resistive transucer wherein a pair of cylindrical anemometer sensing elements are themselves supported by a central support or tertiary element. The tertiary element itself does not adversely alter the measurement response of the pair of sensing elements, and in particular applications, the tertiary element can be used to thermally bias the pair of anemometer sensing elements so as to improve their cosine law agreement when used as direction sensing devices. Each of the three major structural elements or members is cylindrical in cross section, and the outer two elements can be active, with the center support element serving as a passive mechanical support, or the center support element can serve as a third active element, whereby the resistance distribution and the temperature distribution, can be altered selectively so as to modify the spatial response of the primary sensing element pair to incident wind flow or fluid flow. The supported element pair structure particularly lends itself to application as an ocean current speed and direction transducer because of its inherent great mechanical strength and resistance to floating and submerged matter. It should further be noted that the single ended form of the transducer, described as a cantilever transducer, can be constructed with low length to diameter ratio, intentionally distorting the cosine law characteristic which in effect adds a sine component term of small magnitude which renders a vertically oriented transducer relatively insensitive to variations in tilt angle but does not adversely affect the tranducer's ability to detect the sign sense of direction for wind flow from the two horizontal 180° sectors.

Other features and advantages of this invention will be apparent from the following detailed description, appended claims, and the accompanying drawings.

BRIEF DESCRIPTION OF THE DRAWINGS

FIG. 1 is a perspective view of a directional hot film anemometer transducer made in accordance with the principles of the present invention.

FIG. 2 is an elevational sectional view of the directional hot film anemometer transducer structure illustrated in FIG. 1, taken along the line 2—2 thereof, and looking in the direction of the arrows.

FIG. 3 is a perspective view of an alternative form of the directional hot film anemometer transducer illustrated in FIG. 1, and wherein the central supporting element is shown as a straight rod.

FIG. 4 is a perspective view of a further alternative form of the directional hot film anemometer illustrated in FIG. 1, wherein the central supporting element is shown to be of approximately the same length as the two side supported conductor elements.

FIG. 5 is a perspective view of the directional hot film anemometer transducer structure of FIG. 1 modified to provide a cantilevered or single ended transducer, with the electrical connections being made at one end of the transducer.

FIG. 6 is an elevational sectional view of the directional hot film anemometer transducer structure illustrated in FIG. 5, taken along the line 6—6 thereof, and looking in the direction of the arrows.

FIG. 7 is a perspective view of a further embodiment of a directional hot film anemometer transducer made in accordance with the principles of the present invention, wherein three parallel supported electrical resistive sensing elements are used to form the transducer array.

FIG. 8 is an elevational sectional view of the directional hot film anemometer transducer structure illustrated in FIG. 7, taken along the line 8—8 thereof, and looking in the direction of the arrows.

FIG. 9 is a perspective view of an alternative form of the directional hot film anemometer transducer of FIG. 7, wherein the resistive conductor of the central support element is disposed in a limited area of the central element.

FIG. 10 is a graphical representation of the distribution of temperature axially along the directional hot film transducer of FIG. 9.

FIG. 11 is a schematic circuit diagram of an illustrative circuit which may be used to excite the directional hot film anemometer transducers shown in FIG. 1, FIG. 3, FIG. 4, FIG. 5, FIG. 7, and FIG. 9.

FIG. 12 illustrates the polar response which may be realized from a directional hot film anemometer transducer of the present invention when the output signals derived from the excitation circuit of FIG. 11 are appropriately processed, linearized, and combined.

DESCRIPTION OF THE PREFERRED EMBODIMENTS

Referring now to the drawings, and in particular to FIG. 1, the numeral 10 generally designates a directional hot film anemometer transducer constructed in accordance with the principles of the present invention. The transducer 10 includes a pair of cylindrical elements or members 11a and 11b which are resistive sensing elements whose lengths L are usually greater than their diameters D. Both sensing elements 11a and 11b are symmetrically disposed alongside a central cylindrical support element or member 15 to which they are mechanically attached by an adhesive or bridging means 12a and 12b. The bodies of the sensing elements 11a and 11b have connection means at each end formed by the end connection means 13a and 13b and electrical connecting wires 17a and 17b at one end, and the end connection means 14a and 14b and connecting wires 16a and 16b at the other end. The support member 15 is shown as a rigid, shaped wire which can be made from steel or stainless steel, and which provides mechanical rigidity and impact strength for the entire transducer array. The bodies of the sensing elements 11a and 11b are uniformly resistive, and the connection means 13a, 13b, 14a and 14b are made of similar material in order to maintain the highest possible signal to noise performance of the total transducer. The connecting lead wires 16a, 16b, 17a and 17b are also constructed of a material which is similar to that used by the end connection means 13a, 13b, 14a and 14b, in order to avoid unwanted spurious electrical noise. The material usually used is annealed platinum which is extremely malleable and has little supportive strength when used as fine diameter lead wires, therefore, the central cylindrical support member 15 greatly improves the structural strength of the transducer and reduces its susceptibility to impact damage by curious fingers, pencils, sleet, hailstones, gravel, and similar foreign objects. Alternative materials which may be used for the sensing elements 11a and 11b and their associated electrical connections are described in U.S. Pat. No. 3,352,154 and in U.S. Pat. No. 3,900,819.

FIG. 2 illustrates a typical cross section for a directional hot film anemometer transducer 10 of the type illustrated in FIG. 1. The sensing elements 11a and 11b are supported on either side of a rigid support member 15 which can be made of steel or stainless steel if it is to be bent as shown by FIG. 1, in order to facilitate mounting of the transducer so as to avoid aerodynamic interference by the mounting means as much as possible, or it can be made of other material such as refractory ceramic or plastic.

The sensing element 11a consists of a hollow, tubular aluminum oxide refractory substrate cylinder 18a, upon the surface of which is uniformly deposited by firing, sintering, sputtering or other deposition means, a thin coating of platinum metal 19a, which has a further layer 20a of fused silica, aluminum oxide or other protective coating material which provides abrasion and wear protection for the platinum film 19a. Typical dimensions of substrate 18a are a cylinder diameter of 0.024 inches with a bore diameter of 0.012 inches and a length of 1 inch.

A large length (L) to diameter (D) ratio will produce greater angular sensitivity to airflow in the plane containing the axes of the cylinders 11a, 15 and 11b. Flow away from the plane, as shown by flow angle $\alpha$, will be able to have its direction sensed by the sensing element pair 11a and 11b through a 360° change in angle. Sign sense of direction can be determined by electrical inspection of the resistance value of each sensing element 11a and 11b when they are compared with each other by appropriate electrical circuitly as illustrated in U.S. Pat. No. 3,900,819, and reference is made to said U.S. Pat. No. 3,900,819 for a discussion of the operation of the dual sensing elements as a directional fluid flow transducer. Sensing element 11b is similar to sensing element 11a.

Bridging means 12a and 12b can be a semiflexible, thermally isolating adhesive material, such as room temperature vulcanizing silicone rubber, which serves to rigidly support and attach sensing elements 11a and 11b to the central support element 15. Other materials can be used but should not be permitted to cover more than 180° of the circumference of either sensing element 11a or 11b, so as not to interfere with the spatial response of the transducer to the impinging flow. On the other hand a near infinitesimal amount of adhesive material 12a and 12b can be used so as to just close the aerodynamic gap between the sensing elements 11a and 11b and the support element 15.

As a practical matter, the central support element 15 should not be much larger in diameter than the sensing elements 11a and 11b in order to avoid the generation of a large stagnation region ahead of the sensing elements 11a and 11b, which region is determined or generated by the geometry of the central support element 15, rather than by the geometry of the sensing elements themselves. In order to function as an effective directional anemometer transducer, the element geometry must predominantly determine the local flow field past the transducer array.

Typical thickness of the platinum film 19a and 19b is in the range of 2500 to 5000 Angstroms, and a 1 inch long sensing element 11a or 11b with substrate 18a or 18b diameter of 0.024 inches has a resistance of about 3 to 5 ohms at room temperature. Typically, the protective coating 20a or 20b is about 0.0005 to 0.001 inches thick. When aluminum oxide coatings are used, the coating thickness is about 0.002 to 0.005 inches in order to assure gas tightness.

FIG. 3 illustrates a directional hot film anemometer transducer 10a to that described in FIG. 1, and which uses a straight cylindrical support element 15. The same reference numerals are used to designate the various parts of the transducer. The cylindrical support element 15 can be either of metal or ceramic since it is not bent. The transducer array mounting is provided by supporting either end of the cylindrical support element 15.

FIG. 4 illustrates a directional hot film anemometer transducer 10b, similar to that described in FIGS. 1 and 3, and which uses a central cylindrical support element 15, which is the same length as the sensing elements 11a and 11b. In the embodiment of FIG. 4, the transducer support is provided by the electrical connecting lead wires 16a, 16b, 17a and 17b themselves. The central support element 15 provides structural backing for the fragile cylindrical substrates 18a and 18b, as shown in FIG. 2 when fine sizes are used. A cross section view of the embodiments of FIGS. 3 and 4 would be identical to the cross section view of FIG. 2.

FIG. 5 illustrates a cantilevered embodiment 10c of the directional hot film anemometer transducer illustrated in FIGS. 1 and 3, and which may be mounted and supported by one end without aerodynamic interference by the components of the transducer itself. The central support element 15a is, in this case, a hollow tubular cylindrical member through which is passed the outboard electrical lead wire 21 which is connected at junction 22 to jumper lead wires 16a and 16b which are attached to the end connection means 14a and 14b, thereby providing a common electrical connection to the outboard ends of sensing elements 11a and 11b. The inboard or supported end on the cantilever transducer has lead wires 17a and 17b which are attached to sensing elements 11a and 11b by the end connections 13a and 13b. If the central support element 15a is of metal, lead wire 21 must have insulating means for electrical isolation, or the central support 15a can be the electrical conductor itself in the case of certain transducer applications.

FIG. 6 illustrates the cross section structure for the transducer 10c of FIG. 5, and it shows the position of lead wire 21 as it passes through the bore of the central support element 15a. The central support element 15a can be made of the same material as that of the substrates 18a and 18b.

FIG. 7 illustrates a modified embodiment 10d of the transducer of FIG. 1, wherein the central support element 15b is used as an active hot film sensing element, similar to the sensing elements 11a and 11b, and which provides biasing heating at the central portion of the axial transducer array. It has been found that an increase in sensitivity of dual element sensors of the type disclosed in U.S. Pat. No. 3,900,819 can be realized by such heating augmentation, with little additional power, since the tertiary element 15b lies in the thermal lee of sensing elements 11a and 11b. In other words, the leeward sensing element, away from incident wind does not now absorb power from the leading edge sensor which is cooled by incident wind. The end connections 13c and 14c are used to attach lead wires 17c and 16c to the central support element 15b, and mechanical support of the transducer 10d is provided by the lead wires 16a, 16b, 16c and 17a, 17b and 17c.

FIG. 8 illustrates the cross section structure of the transducer 10d of FIG. 7, wherein the central support element 15b is shown to be similar to the sensing elements 11a and 11b, with ceramic substrate 18c similar to 18a and 18b, and with similar resistive films 19a, 19b and 19c, as well as similar protective coatings 20a, 20b and 20c.

FIG. 9 illustrates a modified embodiment 10e of the transducer of FIG. 7, wherein the sensing film 19c is divided into two segments 19c' and 19c'' so as to be deployed near the ends of the central sensing support element 15c. By example, zones A and A' are shown to be approximately equal with a low resistance segment 19c''', zone B, providing electrical connection between the ends of segments 19c' and 19c'' where they lie on the central support element 15c. This unheated zone B, formed by the conductor 19c''', goes completely around the central sensing support element 15c. The end caps 13c and 14c provide connection means for electrical attachment of the lead wires 17c and 16c to the outboard ends of films 19c' and 19c'', respectively. The cross section structural detail of the transducer of FIG. 9 is the same as shown in FIG. 8.

FIG. 10 graphically illustrates the manner by which the temperature distributions may be lineally improved along the length of the transducer array of FIG. 9, wherein the numeral 22 designates the approximate shape of the temperature distribution of the unbiased or uncompensated transducer of FIG. 1. Curves 23a and 23b illustrate the improvement which may be realized by the heating of sensing element sections 19c' and 19c'' of FIG. 9. The ends of the transducer tend to approach ambient temperature by virtue of stem and lead wire conduction heat losses, as well as the lack of heating contribution by the element end cap connections which also serve as heat absorbers or sinks. For ideal spatial or direction response a uniform temperature distribution along the length L of the transducer is desired.

FIG. 11 illustrates a bridge within a four arm Wheatstone bridge which may be used to excite the transducer array of FIGS. 1, 3, 4, 5, 7, and 9. As shown in FIG. 11, resistors 24, 25 and 26 are three arms of the Wheatstone bridge. The fourth arm is formed by resistors 27 and 28, together with sensing elements 11a and 11b which together form a bridge within a bridge. Element 15b, the biasing element of FIGS. 7 and 9, is shown as an optional element. By this connection the total resistance of the series/parallel connection of elements 11a, 11b, and 15b is maintained at a constant value by virtue of the feedback connection provided by amplifier 29 together with current booster amplifier 30 whose output is connected to the Wheatstone bridge at point 31. The bridge error signal is developed across the bridge between points 32 and 33 which are connected to the inverting and non-inverting inputs respectively of amplifier 29. Bridge ground connection is made at point 34. All of the resistors forming the bridge, with the exception of sensing elements 11a and 11b, as well as element 15c, when used, should have low temperature coefficients of resistance versus temperature. The sensing elements must have a non-zero value of temperature coefficient of resistance versus temperature which is substantially larger than the bridge resistors used as the reference arms. Resistor 35 can be used as a temperature sensor which is used for temperature compensation of the hot film velocity sensing elements 11a, 11b and 15c. The anemometric or wind speed output is provided by buffer amplifier 36 which produces a low impedance output 37 which follows the transducer signal which is developed between ground point 334 and point 32. Output 37 in non-linear and follows the approximate fourth root of wind speed, and it also contains a DC or constant term which is determined by the zero wind heating condition, and the output also includes turbulence components. An excellent reference which describes the treatment and use of these signals is "Resistance Temperature Transducers" by Virgil A. Sandborn of Colorado State University, 1972, Meteorology Press, Fort Collins, Colo.

For sign sense of direction, amplifier 38 is connected to junction points 39 and 40 at the direction sensing bridge within the Wheatstone bridge, and the sign sense output 41 will change sign, assuming that bridge 11a, 1b, 27 and 28 is statically balanced for zero wind conditions, depending on whether sensing element 11a or 11b is into the wind flow. Output signals 41 and 37 can be combined by analog or digital computer means in order to arrive at a single signal which uniquely produces wind speed times cosine of the incident wind vector.

FIG. 12 graphically illustrates a polar plot of transducer response looking down on the transducer 10e. Sensing elements 1a and 11b are shown in their geometric relationship to the desired ideal figure eight polar representation of the cosine function 42. It is difficult to construct an ideal sensing element pair, therefore, the measured response is usually somewhat bean-like as shown by curve 43. This can be described approximately as a cosine plus sine function; however, it is not a simple expression. The addition of sensing element 15c with zonal heating, as described by FIGS. 9 and 10 tends to bring the curve 43 closer to the ideal cosine function 42, and experience shown that it can be done in a predictable fashion. The total response coming out of the page is nearly omni-directional, with a separation plane along the vertical 90° 270° axis. A three dimensional representation looks like a toroid, with one polarity output for the right half and the opposite polarity for the left half.

While there have been shown and described the preferred embodiments of the invention, it is understood that various changes, omissions, and substitutions may be made by those skilled in the art and while it will be apparent that the preferred embodiments of the invention are well calculated to fulfill the objects above stated, it will be appreciated that the invention is susceptible to modification, variation and change. What is claimed is:

1. A directional hot film anemometer transducer comprising:
   a. at least two similar, thermally and physically separated resistive electrical conductors;
   b. each of said conductors having a length at least equal to the largest cross section dimension of the conductor;
   c. each of said electrical conductors including a hollow electrically non-conductive refractory cylindrical substrate supporting body extending the length of the conductor, and a conductive resistance film having a non-zero temperature coefficient of resistance adhered to the outer surface of the substrate body and extended over the length of the substrate body, and an overall protective coating which extends over the outer surface of the conductive resistance film over the entire length of the conductive resistance film;
   d. a cylindrical support element centrally disposed between said two resistive electrical conductors;
   e. a thermo insulating bridging means operatively disposed between, and closing the gap between said electrical resistive conductors and said cylindrical central support element over the length of the conductors, thereby preventing connected flow around one conductor independent of the other conductor and the central support element, the overall shape of the transducer being in the form of three connected and near tangent circular cross section members lying with their three respective axes parallel and on one plane, with the conductors being exposed to ventilation over at least a majority of their surface, and with the conductor cross section itself used to define the fluid dynamic cross section which is exposed to the fluid stream where the resulting local stagnation region caused by impinging flow at its point of separation against an outside electrical conductor is therefore small with respect to the conductor cross section, each conductor exhibiting a change in electrical resistivity as a function of temperature; and,
   f. each of said electrical conductors being provided with electrial connection means, whereby each electrial conductor can be electrically heated by an electrial current passing through each conductor.

2. A directional hot film anemometer transducer as defined in claim 1, wherein:
   a. said central support element is solid in cross section.

3. A direction hot film anemometer transducer as defined in claim 1, wherein:
   a. said central support element provides mechanical support and is shaped to facilitate structural mounting and disposition of the transducer.

4. A directional hot film anemometer transducer as defined in claim 1, wherein:
   a. said central support element provides mechanical support and is extended to facilitate structural mounting and disposition of the transducer.

5. A directional hot film anemometer transducer as defined in claim 1, wherein:
   a. said central support element provides mechanical support and is of the same length as the two resistive electrical conductors.

6. A directional hot film anemometer transducer as defined in claim 1, wherein:
   a. said central support element is a hollow tubular cylindrical member.

7. A directional hot film anemometer transducer and defined in claim 6, wherein:
   a. said central support element is extended at an inboard end to provide a cantilevered transducer; and,
   b. the electrical connection means at the outboard end of each electrical conductor is connected to electrical lead wire means extended through the hollow tubular support element to provide an electrical connection to the outboard ends of the electrical conductors.

8. A directional hot film anemometer transducer as defined in claim 6, wherein:
   a. said central support element comprises a substrate supporting body for a third conductive resistance film having a non-zero temperature coefficient of resistance, and an overall protective coating extended over the outer surface of the conductive resistance film, to provide a third resistive electrical conductor.

9. A directional hot film anemometer transducer as defined in claim 8, wherein:
   a. said third conductive resistance film extends over the length of the third substrate supporting body.

10. A directional hot film anemometer transducer as defined in claim 8, wherein:
    a. said third conductive resistance film is applied on the third substrate supporting body in a pair of axially spaced zonal segments which are electrically connected by an intermediate low resistance segment.

11. A directional hot film anemometer transducer as defined in claim 8, wherein:

a. said third conductive resistance film is applied on the third substrate supporting body in a plurality of axially spaced zonal segments which are electrically connected.

12. A directional hot film anemometer transducer as defined in claim 8, wherein:
    a. the three cylindrical resistive electrical sensing conductors are connected in a series parallel arrangement, with a pair of series connected balancing resistors which are connected in parallel across the series parallel connected cylindrical resistive electrical sensing conductors so as to form one arm of a four arm feedback controlled Wheatstone bridge;
    b. said Wheatstone bridge bridge operatively connected to a differential error amplifier and current booster amplifier whose output is feedback, in a negative feedback manner, to the top of the Wheatstone bridge, thereby providing for brige excitation and consequent operation of the directional anemometer transducer as a constant temperature anemometer, wherein the two outermost cylindrical resistors electrical sensing conductors are operated in series with their midpoint electrical junction compared with the equivalent midpoint of the pair of series connected balancing resistors;
    c. an electrical comparator means operatively connected between said midpoint electrical junctions for carrying out the said comparing operation, and whose output signal is an indication of the signal sense of the incident fluid flow on the series connected two outermost cylindrical electrical sensing conductors which have their endpoints connected across the third cylindrical electrical sensing conductor;
    d. said three cylindrical resistive sensing conductors and the pair of balancing resistors being maintained at a constant equivalent resistance value so as to operate as said one arm of said feedback Wheatstone bridge and which arm provides an electrical output signal which is the voltage developed across the bridge formed by the three electrical sensing conductors and two balancing resistors within the feedback Wheatstone bridge; and,
    e. a differential amplifier operatively connected to said feedback Wheatstone bridge for amplifying said voltage to a level suitable for further processing.

13. A directional hot film anemometer transducer as defined in claim 1, wherein:
    a. the two cylindrical resistive electrical sensing conductors are connected in a series arrangement, with a pair of series connected balancing resistors which are connected in parallel across the series connected cylindrical resistive electrical sensing conductors so as to form one arm of a four arm feedback controlled Wheatstone bridge;
    b. said Wheatstone bridge being operatively connected to a differential error amplifier and current booster amplifier whose output is feedback, in a negative feedback manner, to the top of the Wheatstone bridge, thereby providing for bridge excitation and consequent operation of the directional anemometer transducer as a constant temperature anemometer, wherein the two cylindrical resistors electrical sensing conductors are operated in series with their midpoint electrical junction compared with the equivalent midpoint of the pair of series connected balancing resistors;
    c. an electrical comparator means operatively connected between said midpoint electrical junctions for carrying out the said comparing operation, and whose output signal is an indication of the sign sense of the incident fluid flow on the series connected cylindrical electrical sensing conductors;
    d. said two cylindrical resistive sensing conductors and the pair of balancing resistors being maintained at a constant equivalent resistance value so as to operate as said one arm of said feedback Wheatstone bridge and which arm provides an electrical output signal which is the voltage developed across the bridge formed by the two electrical sensing conductors and two balancing resistors within the feedback Wheatstone bridge; and,
    e. a differential amplifier operatively connected to said feedback Wheatstone bridge for amplifying said voltage to a level suitable for further processing.

* * * * *

UNITED STATES PATENT OFFICE
CERTIFICATE OF CORRECTION

Patent No. 4,024,761            Dated    May 24, 1977

Inventor(s)    ROBERT S. DJORUP

It is certified that error appears in the above-identified patent and that said Letters Patent are hereby corrected as shown below:

Column 2, line 13, between "with" and "low" insert -- a --.
Column 6, line 11, "23and" should be -- 23 a and --; line 17, "end" should be -- and --; line 54, "334" should be -- 34 --; line 54, "in" should be -- is --; line 68, "1b" should be -- 11b --.  Column 7, line 9, "1a" should be -- 11a --; line 18, "shown" should be -- shows --.

Claim 1, line 5 of element (e), "prevening" should be -- preventing --.
Claim 12, line 1 of element (b), omit "bridge" second occurrence; same claim, same element, line 5, "brige" should be -- bridge --; same claim, same element, line 9, "resistors" should be --resistors -- same claim, line 4 of element (c), "signal", second occurrence, should be -- sign --.  Claim 13, line 9 of element (b), "resistors" should be -- resistors' --.

Signed and Sealed this ninth Day of August 1977

[SEAL]

Attest:

RUTH C. MASON
Attesting Officer

C. MARSHALL DANN
Commissioner of Patents and Trademarks